March 6, 1934.  A. McD. GRAY  1,950,140
REFINING HYDROCARBONS
Filed Sept. 23, 1930
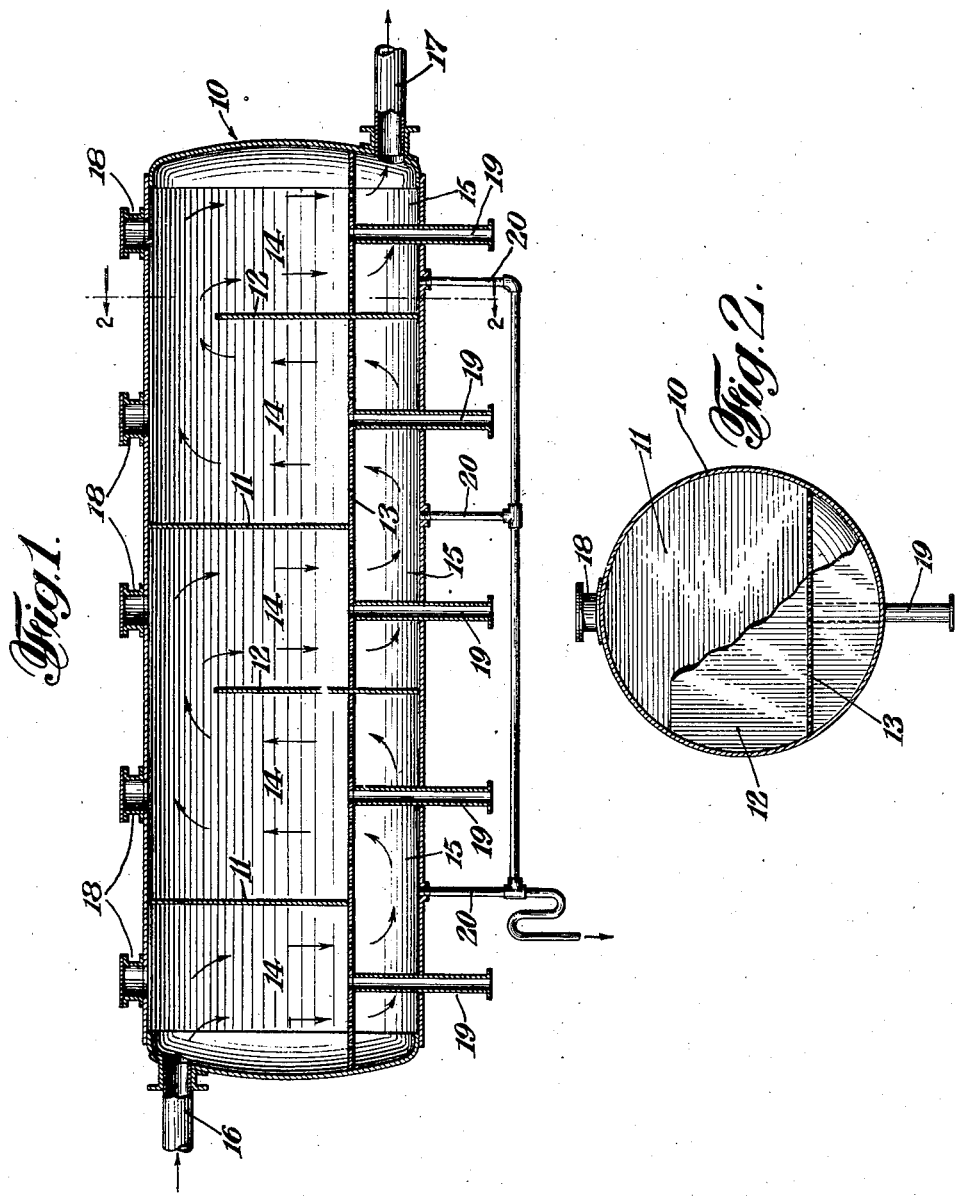
INVENTOR
Alanson McDowell Gray
BY Kenyon & Kenyon
ATTORNEY Patented Mar. 6, 1934

1,950,140

UNITED STATES PATENT OFFICE 1,950,140

REFINING HYDROCARBONS

Alanson McDowell Gray, Elizabeth, N. J., assignor to The Gray Processes Corporation, Newark, N. J., a corporation of Delaware Application September 23, 1930, Serial No. 433,732

11 Claims. (Cl. 196—96)

This invention relates to refining hydrocarbons and pertains more especially to an apparatus for use in the refining of cracked hydrocarbons by contact with solid adsorptive treating material.

In refining cracked gasoline and other similar hydrocarbons by passing the same in vapor phase through solid adsorptive material capable of selectively polymerizing the unstable, unsaturated compounds contained in such hydrocarbons, better results are obtained and the treating material has a longer effective life if the treating material is in the form of a plurality of beds or zones through which the vapor is passed serially, and means are provided for preventing contamination of a zone by polymers and condensate produced in a prior zone.

An object of this invention is an inexpensive and efficient apparatus in which the treating material is arranged in zones and each zone is supported for free liquid drainage.

Other objects, novel features and advantages of this invention will be apparent from the following specification and accompanying drawing, wherein:

Fig. 1 is a vertical section through an embodiment of the invention, and

Fig. 2 is a section on the line 2—2 of Fig. 1.

The apparatus comprises a horizontally arranged cylindrical shell 10 closed at both ends. Within the shell are provided a series of vertical baffles 11 and 12. The baffles 11 extend downwardly from the top of the shell while the baffles 12 extend upwardly from the bottom of the shell. A horizontal perforated shelf engages the bottom ends of the baffles 11 and intersects the baffles 12. The baffles 11 and the upper portions of the baffles 12, together with the shell 13 form a series of chambers 14, while the lower portions of the baffles 12 and the partition 13 form another series of chambers 15. An inlet 16 leads into one end of the shell and an outlet 17 leads from the other end. Preferably, the arrangement of the baffles and the inlet and outlet is such that vapor is caused to flow downwardly through one chamber 14, through the adjacent chamber 15 into the second chamber 14 and upwardly through the same, after which it passes over the top of the baffle 12 and downwardly through the third chamber 14, through the second chamber 15, upwardly through the fourth chamber 14, downwardly through the fifth chamber 14, into the third chamber 15 from which it escapes through the outlet 17. However, the arrangement of baffles and inlet and outlet may be varied to obtain upward flow through either the first or last zone, or both if desired. Manholes 18 are provided for charging treating material into the chambers and discharge spouts 19 are provided for removing spent treating material from the chambers. Each of the chambers 15 is provided with a drainage pipe 20 through which liquid collecting in the chambers is removed. The spacing of the baffles 11 and 12 is preferably such that the treating zones in which the vapor flows downwardly are of less cross section than the treating zones in which the vapor flows upwardly.

In the operation of this apparatus, the chambers are charged with suitable solid treating material which is supported by the shelf for free drainage and mineral wool or the like may be placed over the shelves to prevent treating material dropping through the perforations. This treating material may be fuller's earth or any other solid adsorptive treating material capable of selectively polymerizing the unstable, unsaturated constituents of cracked gasoline. Cracked hydrocarbon vapors are then introduced through the inlet 16 and are caused to pass successively through the different beds or zones of treating material and are eventually discharged through the outlet 17. During the passage of the vapors through the zones, the unstable, unsaturated compounds are polymerized into higher boiling compounds which condense at the temperature of operation and drain through the shelf 13 into the chambers 15. Some condensation of the vapors also takes place and such condensate is likewise collected in the chambers 15. The velocity of the vapors in the wide chambers 14 is less than that in the narrow chambers 14 and is such that the upward flow of vapors does not substantially affect the drainage of polymers in these chambers. The polymers and condensate produced in each zone are separately drained and removed from the vapor stream so that no one of these zones is contaminated by polymers or condensate formed in a previous zone.

The treating material in the different chambers may be all the same or different kinds of treating material may be provided in successive chambers for subjecting the vapor to different treatments. The treating material in each chamber will depend upon the treatment to which the vapor is to be subjected in such chamber.

It is of course understood that various modifications may be made in the apparatus above described, without in any way departing from the spirit of the invention as defined in the appended claims.

I claim:

1. An apparatus for refining hydrocarbons in vapor phase comprising a horizontal shell having a vapor inlet at one end and a vapor outlet at the other end, a plurality of vertical baffles extending alternately from the top and bottom of said shell, a fluid permeable shelf coacting with said baffles to form a plurality of serially connected chambers above and below said shelf, said shell being adapted to support beds of treating material through which vapor flows successively in passing from said inlet to said outlet.

2. An apparatus for refining hydrocarbons in vapor phase comprising a horizontal shell having a vapor inlet at one end and a vapor outlet at the other end, a plurality of baffles located within said shell and dividing the interior of the shell into a plurality of serially connected compartments, a horizontal fluid permeable shelf coacting with said baffles to form a plurality of serially connected chambers above and below said shelf through which vapor flows successively in passing from said inlet to said outlet, said baffles being so spaced that the chambers through which the vapor flows upwardly are of larger cross-section than the chambers through which the vapor flows downwardly.

3. An apparatus for refining hydrocarbons in vapor phase comprising a horizontal shell having an inlet at one end and an outlet at the other end, a plurality of vertical baffles extending alternately from the top and bottom of said shell, and a horizontal fluid permeable shelf arranged below said inlet and above said outlet to form with said baffles a plurality of serially connected chambers above and below said shelf through which vapor flows successively in passing from said inlet to said outlet.

4. An apparatus for refining hydrocarbons in vapor phase comprising a horizontal shell having an inlet at one end and an outlet at the other end, a plurality of vertical baffles extending alternately from the top and bottom of said shell, and a horizontal fluid permeable shelf arranged below said inlet and above said outlet to form with said baffles a plurality of serially connected chambers above and below said shelf through which vapor flows successively in passing from said inlet to said outlet, said baffles being so spaced that the chambers in which the vapor flows upwardly are of greater cross-section than the chambers in which the vapor flows downwardly.

5. An apparatus for refining hydrocarbons in vapor phase comprising a horizontal shell, a plurality of vertical baffles extending alternately from the top and bottom of said shell, fluid permeable means coacting with said baffles to from a plurality of serially connected chambers, above and below said means, a vapor inlet communicating with one end chamber above the fluid permeable means therein, and a vapor outlet communicating with the other end chamber below the fluid permeable means therein.

6. An apparatus for refining hydrocarbons in vapor phase comprising a horizontal shell, a plurality of vertical baffles extending alternately from the top and bottom of said shell, fluid permeable means coacting with said baffles to form a plurality of serially connected chambers above and below said means, a vapor inlet communicating with one end chamber above the fluid permeable means therein, and a vapor outlet communicating with the other end chamber below the fluid permeable means therein, said baffles being so spaced that the chambers in which the vapor flows upwardly are of greater cross-section than the chambers in which the vapor flows downwardly.

7. An apparatus for refining hydrocarbons in vapor phase comprising a horizontal shell, a plurality of vertical baffles extending alternately from the top and bottom of said shell, fluid permeable means arranged between successive baffles and between the ends of the shell and the adjacent baffles to form therewith serially connected chambers above and below said means and to support beds of solid treating material, a vapor inlet communicating with one end of the shell above said supporting means, and a vapor outlet communicating with the other end of said shell below said supporting means.

8. An apparatus for refining hydrocarbons in vapor phase comprising a horizontal shell, a plurality of vertical baffles extending alternately from the top and bottom of said shell, fluid permeable means arranged between successive baffles and between the ends of the shell and the adjacent baffles to form therewith serially connected chambers and to support beds of solid treating material, a vapor inlet communicating with one end of the shell above said supporting means, and a vapor outlet communicating with the other end of said shell below said supporting means, said baffles being so spaced that the beds of treating material through which vapor passes upwardly are of greater cross-section than the beds of treating material through which the vapor passes downwardly.

9. An apparatus for refining hydrocarbons in vapor phase comprising a horizontal shell, a plurality of vertical baffles extending alternately from the top and bottom of said shell, fluid permeable means arranged between successive baffles and between the ends of the shell and the adjacent baffles to form therewith serially connected chambers and to support beds of solid treating material, a vapor inlet communicating with one end of the shell, and a vapor outlet communicating with the other end of said shell.

10. An apparatus for refining hydrocarbons in vapor phase comprising a horizontal shell, a plurality of vertical baffles extending alternately from the top and bottom of said shell, fluid permeable means arranged between successive baffles and between the ends of the shell and the adjacent baffles for supporting beds of solid treating material, a vapor inlet communicating with one end of the shell, and a vapor outlet communicating with the other end of said shell, said baffles being so spaced that the beds of treating material through which vapor passes upwardly are of greater cross-section than the beds of treating material through which the vapor passes downwardly.

11. An apparatus for refining hydrocarbons in vapor phase comprising a horizontal shell, a plurality of baffle plates extending downwardly from the top of the shell, a perforated horizontal partition underlying and contacting with the bottom edges of said plates, a plurality of baffle plates extending upwardly from the bottom of said shell and projecting through said partition into the space above it, a conduit communicating with one end of the shell above said partition and a conduit communicating with the other end of said shell below said partition.

ALANSON McDOWELL GRAY.